(12) United States Patent
Boysen et al.

(10) Patent No.: US 11,501,018 B2
(45) Date of Patent: Nov. 15, 2022

(54) NETWORK-COMPATIBLE DEVICE

(71) Applicant: Phoenix Contact GmbH & Co. KG, Blomberg (DE)

(72) Inventors: Gerrit Boysen, Detmold (DE); Andreas Fuss, Berlin (DE); Ingo Hilgenkamp, Rietberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 153 days.

(21) Appl. No.: 16/992,338

(22) Filed: Aug. 13, 2020

(65) Prior Publication Data

US 2021/0056228 A1 Feb. 25, 2021

(30) Foreign Application Priority Data

Aug. 19, 2019 (DE) ...................... 10 2019 122 155.2

(51) Int. Cl.
| | | |
|---|---|---|
| *G06F 21/62* | (2013.01) | |
| *G06F 21/78* | (2013.01) | |
| *G06F 21/64* | (2013.01) | |
| *G06F 21/87* | (2013.01) | |

(52) U.S. Cl.
CPC .......... *G06F 21/6245* (2013.01); *G06F 21/64* (2013.01); *G06F 21/78* (2013.01)

(58) Field of Classification Search
None
See application file for complete search history.

(56) References Cited

U.S. PATENT DOCUMENTS

| | | | |
|---|---|---|---|
| 11,106,386 B1* | 8/2021 | Sun ...................... | G06F 16/2455 |
| 2011/0219102 A1 | 9/2011 | Sankaran | |
| 2011/0231543 A1 | 9/2011 | Akazawa et al. | |
| 2013/0103641 A1 | 4/2013 | Rehman | |
| 2013/0269032 A1* | 10/2013 | Chasko ............... | H04L 63/1491 |
| | | | 726/23 |
| 2015/0269805 A1 | 9/2015 | Korala | |
| 2015/0293732 A1* | 10/2015 | Kyoo ..................... | G06F 21/608 |
| | | | 358/1.14 |
| 2015/0350218 A1* | 12/2015 | Milman .................. | H04L 67/01 |
| | | | 726/4 |
| 2015/0370656 A1* | 12/2015 | Tsafrir .................... | G06F 3/067 |
| | | | 714/6.3 |
| 2016/0203086 A1* | 7/2016 | Ng ...................... | G06F 21/6209 |
| | | | 713/193 |

(Continued)

FOREIGN PATENT DOCUMENTS

| | | |
|---|---|---|
| DE | 10 2011 009 054 A1 | 7/2012 |
| WO | WO 2003/075125 A2 | 9/2003 |

*Primary Examiner* — Venkat Perungavoor
(74) *Attorney, Agent, or Firm* — Holland & Hart LLP

(57) ABSTRACT

A network-compatible device with a security function for destroying user data includes the a signal input configured to receive a control signal and a configuration signal; a memory configured to store first user data; and a controller configured, upon receipt of the control signal, to carry out a safety function which destroys the first user data in the memory. The network-capable device is inoperable when the first user data is destroyed, and the controller is further configured, upon receipt of the configuration signal, which includes second user data, to store the second user data in the memory to enable the network-compatible device to operate based on the second user data.

14 Claims, 3 Drawing Sheets

(56) References Cited

U.S. PATENT DOCUMENTS

| | | | |
|---|---|---|---|
| 2017/0116440 A1* | 4/2017 | Huang | G06F 21/6218 |
| 2017/0126496 A1 | 5/2017 | Sikand et al. | |
| 2018/0013722 A1* | 1/2018 | Enos | G16H 40/20 |
| 2019/0095150 A1* | 3/2019 | Sugimoto | B41J 29/13 |
| 2020/0159460 A1* | 5/2020 | Shivanna | G06F 12/0246 |
| 2022/0019369 A1* | 1/2022 | Shah | H04L 12/40032 |

* cited by examiner

NETWORK-COMPATIBLE DEVICE

CROSS-REFERENCE

The preset application claims the benefit of German Patent Application No. 10 2019 122 155.2, filed Aug. 19, 2019, entitled "Netzwerkfähiges Gerät," which is incorporated herein by reference for all purposes.

BACKGROUND

The present disclosure relates to a network-capable device with a security function for destroying user data.

Network-compatible devices, in particular network infrastructure components, are typically operated with a device configuration which has data worth protecting. For operational and/or legal reasons, it may be necessary to keep the data secret and/or to protect it against unauthorized access by third parties. In particular, if network-compatible devices are switched off or put out of operation or are used for a new purpose, it may not be guaranteed that the previous device configuration can no longer be read out and the data is protected accordingly.

SUMMARY

It is the object of the present disclosure to provide a more efficient network-compatible device which, in particular, a security fraction for destroying the user data.

This object is solved by the features of the independent claim. Advantageous examples are the subject of the dependent claims, the description and the accompanying figures.

The present disclosure is based on the knowledge that the above object can be solved by a network-capable device which has a security function. The safer function can be performed manually and/or automatically triggered by an event, the user data being irretrievably deleted when the safety function is triggered. The secure deletion prevents data from being read back from the memory cells. In particular, the secure deletion of user data takes place immediately in the event of an automatic call of the safety function. The network-compatible device becomes unusable in the context of the current application by calling the safety function, but can be put into operation again with a new configuration.

According to a first aspect, the disclosure relates network-compatible device with a security function for destroying user data. The network-compatible device comprises a signal input which is designed to receive a configuration signal and a memory which is designed to store first user data.

Furthermore, the network-compatible device comprises a controller, which is designed to perform a safety function upon receipt of the control signal, which destroys first user data in the memory, the network-compatible device being inoperable when the first user data is destroyed. The controller is further designed to store the second user data in the memory upon receipt of the configuration signal, which comprises second user data, in order to enable operation the network-compatible device on the basis of the second user data.

The network-compatible device can in particular be an infrastructure component which is integrated into a network and can receive data, in particular user data, from the network. The user data can include configurations, passwords, certificates, log files, personal data and/or notes and other user or application-generated data. These data can be subject to operational data protection and/or legal data protection, so that it may be necessary for access to the user data to be regulated, logged and/or restricted using the network-compatible device.

Depending on the type of storage used, the destruction of data can be defined as a non-recoverable deletion of the data. For example, when magnetic and/or semiconductor-based memories are used, the original data can be prevented from being read out by rewriting the memory segments which contain the data to be destroyed, with, in particular, random data. If the data is destroyed, however, the functionality of the memory can be retained, so that the memory can be written with new user data in order to enable the functionality of the network-compatible device with a new configuration in the form of second user data. The first user data can be stored encrypted in the memory using a cryptographic method, in particular using a cryptographic key, so that the first user data can be destroyed by deleting the cryptographic key. Since access to the first user data is only possible using the cryptographic key, the first user data can no longer be decrypted when the key is deleted and, accordingly, can no longer be restored.

The cryptographic key can be stored in a security module of the network-compatible device, for example in a Trusted Platform Module (TPM). The security module can be designed to prevent unauthorized reading of the cryptographic key. Furthermore, the cryptographic key cannot be reconstructed the data stored on the network-compatible device. In one example, the controller is designed to encrypt and/or decrypt the first user data using a cryptographic key. Furthermore, the controller can be designed to receive the cryptographic key via a network interface.

In one example, the memory segments, memory sectors or memory cells can not only be released for reuse in the event of such a secure deletion, but the existing data can be actively removed and or overwritten in order to reduce a security risk.

When the control signal is received, the delete function can be carried out automatically and/or immediately in order to destroy the user data as quickly as possible. In particular, the data can be erased without a delay that extends beyond an ordinary signal runtime and/or an ordinary period of time that the erasure itself takes.

In one example, the signal input is designed to receive a maintenance signal, and the controller is designed to carry out the safety function if the maintenance signal is not present at the signal input during operation of the network-compatible device. This has the advantage that the network-compatible device remains operational depending on an active signal supply. For example, this can ensure that when the network-compatible device changes location from the current application without switching on the maintenance signal at the new location, no more user data is stored. Accordingly, the security function can be triggered in the event of unauthorized access or removal of the network-compatible device from the current application. In addition, when the network-compatible device is changed to a new application, the inadvertent provision of the first user data can be prevented. In particular, a specific maintenance signal can be coded for each application.

In one example, the controller is configured to be configurable in order to configure the signal shape of the maintenance signal to be received by means of the signal input. This has the advantage that the network-compatible device can be operated with an individualized maintenance signal in order to prevent further use of the network-compatible device without preventing the individualized maintenance signal. The maintenance signal can be identical, for example, for a group of network-compatible devices of a user, but different with respect to a further group of network-compatible devices of another user. Correspondingly, an exchange of network-compatible devices between the users with preservation of the respective user can be prevented.

In one example, the network-compatible device comprises a user interface, which is connected upstream of the signal input and is designed to record a user input and to make it available to the controller via the signal input, the controller being configurable by means of the user interface and the user interface being designed to generate the control signal and/or the configuration signal. This has the advantage that the network-compatible device is configurable. In particular, the user interface can detect haptic and/or acoustic input at the installation location of the network-compatible device, so that the network-compatible device can be configured by a user via a key and/or voice input.

Furthermore, the user interface can be are electronic interface, which can be controlled by means of an, in particular remotely arranged, electronic access terminal in order to configure the network-compatible device with corresponding control commands.

In one example, the signal input is a digital input which is designed to receive a coded maintenance signal, the controller being designed to prevent the first user data from being destroyed if the coded maintenance signal is present at the digital input during operation of the network-compatible device.

With the coding of the signal, the advantage can be achieved in particular that the replication of the maintenance signal can be prevented. Accordingly, operation of the network-compatible device can be linked to the coded maintenance signal, so that in the event of unauthorized access to the network-compatible device, the first user data cannot be read out and/or the network-compatible device cannot be operated on the basis of the first user data.

The coded maintenance signal can further comprise a maintenance message, the controller being designed to evaluate the maintenance message and trigger the security function in accordance with the content, of the maintenance message. The maintenance message can also be encrypted in order to prevent unauthorized access.

In one example, the network-compatible device comprises a first switching signal input and a second switching signal input, a first switching signal being able to be applied to the first switching signal input and a second switching signal being able to be applied to the second switching signal input. Furthermore, the controller is designed to carry out the safety function when the first switching signal is present at the first switching signal input if the second switching signal is not present at the second switching signal input.

This can in particular achieve the advantage that the network-compatible device is coupled to a door and/or housing contact via the first switching signal input and/or is coupled to a lock and/or unlocking contact via the second switching signal input. When the housing or the door is opened, for example, the first switching signal can be present at the first switching signal input, so that the first switching signal indicates access or an approach to the network-compatible device. The housing opening or the door can in particular form the only physical access to the network-compatible device. When the door or the housing is opened, the second switching signal would also have to be present in order to prevent the safety function from being carried out.

The second switching signal can be generated, for example, by a lock or another unlocking unit, with the second switching signal being able to authorize access to the network-compatible device by, for example, opening the door or the housing. In order to prevent deletion of the first user data, the second switching signal would have to be present at the network-compatible device at the same time and/or before the first switching signal, since the controller can be designed to check whether the second switching signal is present when the first switching signal is present. If no second switching signal is detected during the check, the safety function can be triggered.

The second switching signal at the lock and/or unlocking contact can be, for example, an authorized unlocking of the lock with a key. The key can be an electronic key or a mechanical key.

In one example, a first switch is connected to the first switching signal input and a second switch is connected to the second switching signal input, and the first switching signal input can be supplied with the first switching signal via the first switch and the second switching signal input can be supplied with the second switching signal via the second switch.

This can achieve the advantage that when the respective switch is closed, the respective switching signal can be present at the corresponding switching signal input. The switches can each be designed as openers or closers. Correspondingly, the control can be designed to detect an opening of a first switch when the first switching signal is not present and to check accordingly whether the second switching signal is also not present. If the second switching signal is still present, the second switch has not been opened and the safety function can be triggered.

The controller can be designed to continuously monitor the switching signal inputs and to check the signal present at the second switching signal input for a preset switching criterion in the event of a signal change at the first switching signal input and to trigger the safety function in the event of a deviation from the preset switching criterion. Accordingly, the second switching signal is used to validate the first switching signal. If there is an invalid change in the first switching signal in relation to the second switching signal. the safety function can be triggered.

In one example, the network-compatible device comprises a network interface, the controller being designed to monitor whether the network-compatible device is accessed via the network interface and to perform the security function when an access is determined if the second switching signal is not present at the second switching signal input.

The network interface can be a wired interface, which is designed particular to integrate the network-compatible device into a network. The network can in particular meet one of the following standards: TCP/IP, http, https, UDP, Ethernet/IP, PROFINET, EtherCAT, Modbus-TCP, POWERLINK, PROFIBUS DP, Modbus-RTP, CC-Link, CANopen, DeviceNet or others computer-based connections, which can also include fieldbus systems. Furthermore, the network interface can be a wireless interface, in particular a WLAN, NFC or Bluetooth interface and any type of mobile radio.

The controller can be designed to also detect unauthorized network access with the monitoring of the second switching signal input and to trigger the safety function accordingly. It may therefore be necessary to ensure before a network access that the second switching signal is present at the second switching signal input in order to prevent the first user data from being destroyed.

In one example, the network-compatible device comprises a first switching signal output which is connected to the first switch and a second switching signal output which is connected to the second switch, the controller being designed to provide the first switching signal at the first switching signal output and to provide the second switching signal at the second switching signal output.

This has the advantage that the network-compatible device is independent of external devices and/or signals with regard to the monitoring of the switches. With the generation of the first switching signal and the second switching signal, it is further predefined which signal form is to be expected at the respective switching signal input when the first switch or the second switch is switched. By comparing the signals received at the switching signal inputs with the generated switching signals, which are output via the respective switching signal output, unauthorized access can be distinguished from authorized access and, in the case of unauthorized access, the security function can be triggered.

In one example, the controller is designed to generate a dynamic, unambiguous signal as the first switching signal and/or as the second switching signal and to compare the signal at the first switching signal input and/or the second switching signal input with the dynamic, unambiguous signal. The controller is also designed to perform the safety function in the event of a signal deviation between the provided dynamic, unambiguous signal and the received switching signal.

A dynamic, unambiguous signal can be different, in particular, from dynamic signals of further network-compatible devices. Furthermore, the signal can have a predetermined signal level sequence and/or time-varying signal levels which are suitable for being received at the respective switching signal input in an unchanged manner. Furthermore, the dynamic, unambiguous signal can contain a time stamp and/or time information, so that the dynamic, unambiguous signal can have a limited temporal validity. In this way, for example, the advantage can be achieved that the dynamic, unambiguous signal is not recorded and is supplied to the network-compatible device at a later point in time as a switching signal, since the validity of the switching signal is linked to the time information and/or the time stamp.

With the dynamic, unambiguous signal, use of the network-compatible device in an application environment, which does not replicate the dynamic, unambiguous signal, can also be prevented, since the safety function could trigger accordingly.

In one example, the network-compatible device comprises a network interface, the controller being designed to send a message to at least one further network-compatible device when the safety function is triggered by means of the network interface, in order to trigger destruction of user data also on the further network-compatible device.

In particular, this can achieve the advantage that a single, unauthorized access to a network-compatible device of a plurality of network-compatible devices can trigger the execution of the security function on all network-compatible devices that are connected to one another via the network. Accordingly, the user data can be protected on all network-compatible devices. For this purpose, the network-compatible devices can be identically, in particular with regard to the switching signal inputs.

In one example, a first number of network-compatible devices of the plurality of network-compatible devices can be controlled by at least one network-compatible device by means of a message in order to trigger the security function on the respective network-compatible device of the first number of network-compatible devices. As a result, the first number of network-compatible devices can be protected, for example, against unauthorized access to the respective user data if these network-compatible devices do not have their own means for detecting unauthorized access.

In one example, the message is an individual message which is addressed to a specific further network-compatible device, the individual message comprising an instruction for executing a security function for deleting user data on the further network-compatible device.

This can, for example, achieve the advantage that the network-compatible device can address a group of selected further network-compatible devices and can trigger the execution of the safety function for deleting the respective first user data on these devices. In particular, the network-compatible device can be designed to select, on the type of the switching signals detected, on which network-compatible devices the safety function is to be carried out.

In one example, the message is a broadcast message which is addressed to an indefinite number of further network-compatible devices, the broadcast comprising an instruction for executing a security function for deleting user data on the respective network-compatible device.

In one example, the controller is designed to monitor the network interface and to receive a message via the network interface, the controller also being designed to carry out the security function when the message is received.

Furthermore, the network-compatible device can be designed to receive a broadcast message and/or an individual message via the network interface and to trigger the security function when the respective message is received. Furthermore, the controller can be designed to prevent the safety function from being executed even when a broadcast or individual message is received if the first switching signal is present at the first switching signal input and the second switching signal is present at the second switching signal input.

In one example, the controller is designed to replace the first user data with standard data when the safety function is carried out, the further operation of the network-compatible device being prevented in the context of the specific application by loading the standard data.

BRIEF DESCRIPTION OF THE DRAWINGS

Further exemplary examples are explained with reference to the attached figures described below.

DETAILED DESCRIPTION

Figure 1:
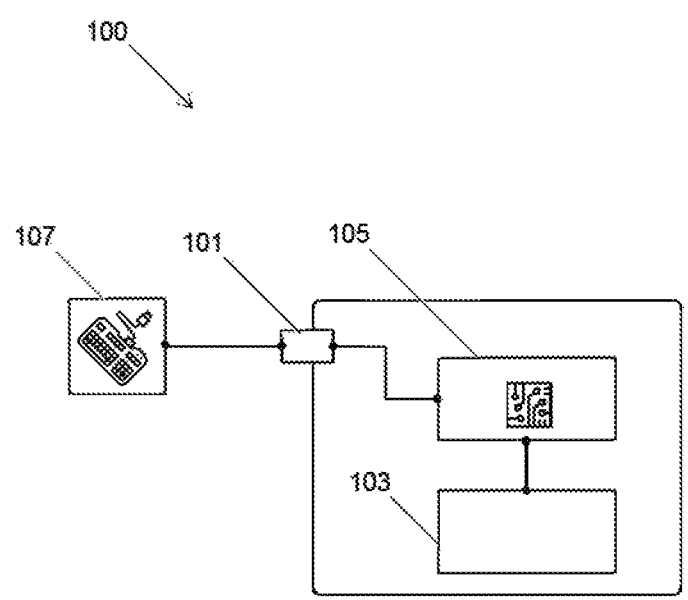
FIG. 1 shows a network-compatible device in one example.

FIG. 1 shows a schematic view of a network-compatible device 100 with a security function for the destruction of user data. The network-compatible device includes a signal input 101, which is designed to receive control signal and a configuration signal, a memory 103, which is designed to store first user data, and a controller 105, which is designed, upon receipt of the control signal, to perform a safety function which destroys the first user data in the memory 103, the network-capable device 100 being inoperative when the first user data is destroyed.

The controller 105 is also designed, upon receipt of the configuration signal, which comprises second user data, to store the second user data in the memory 103, in order to enable the network compatible device 100 to operate on the basis of the second user data.

The signal input 101 is also designed to receive a maintenance signal, and the controller 105 is configured to carry out the safety function if the maintenance signal is not present at the signal input 101 during the operation of the network-compatible device 100. Furthermore, the controller 105 is configured to be configurable in order to configure the signal shape of the maintenance signal to be received by means of the signal input 101.

The network-compatible device 100 comprises a user interface 107, which is connected upstream of the signal input 101 and is designed to record a user input and to make it available to the controller 105 via the signal input 101, the controller 105 being configurable by means of the user interface 107 and the user interface 107 being designed to generate the control signal and/or the configuration signal.

The signal input 101 can be a digital input, which is designed to receive a coded maintenance signal, wherein the controller 105 is designed to prevent destruction of the first user data if the coded maintenance signal is present at the digital input during operation of the network-compatible device 100.

Figure 2:
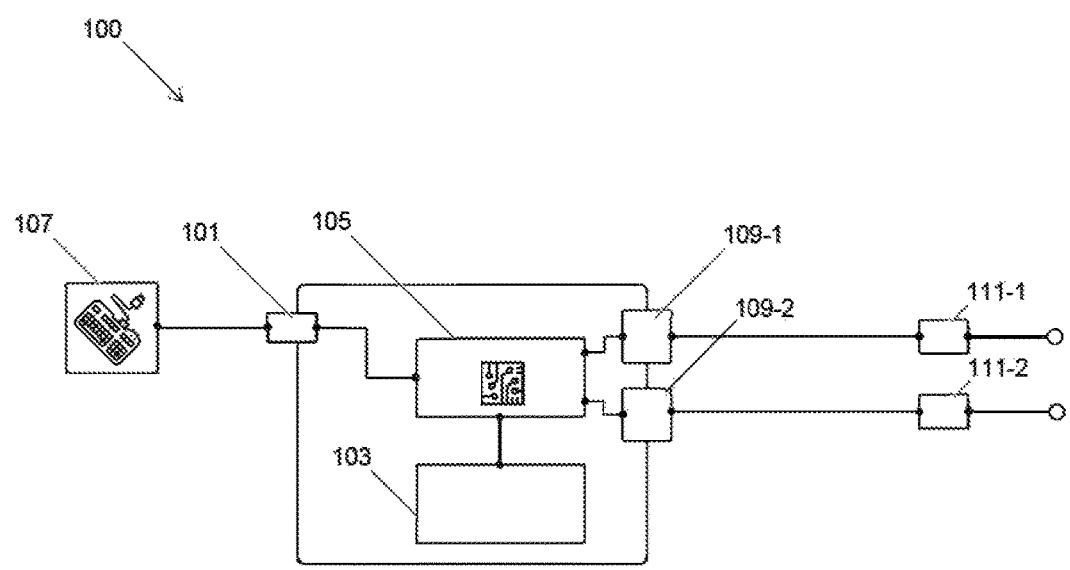
FIG. 2 shows a network-compatible device in one example.

FIG. 2 shows a schematic view of a network-capable device 100, with a signal input 101, which is designed to receive a control signal and a configuration signal, a memory 103, which is designed to store first user data, and a controller 105, which is designed to perform a safety function upon receipt of the control signal, which destroys the first user data in the memory 103.

The network-compatible device 100 further comprises a first switching signal input 109-1 and a second switching signal input 109-2, wherein a first switching signal can be applied to the first switching signal input 109-1 and a second switching signal can be applied to the second switching signal input 109-2. The controller 105 is also designed to perform the safety function when the first switching signal is applied to the first switching signal input 109-1 if the second switching signal present at the second switching signal input 109-2.

A first switch 111-1 is connected to the first switching signal input 109-1 and a second switch 111-2 is connected to the second switching signal input 109-2, and the first switching signal input 109-1 can be supplied with the first switching signal via the first switch 111-1 and the second switching signal input 109-2 can be supplied with the second switching signal via the second switch 111-2.

The first switching signal and the second switching signal can be provided, for example, by an external signal source. In particular, the first switching signal may be different from the second switching signal.

Figure 3:
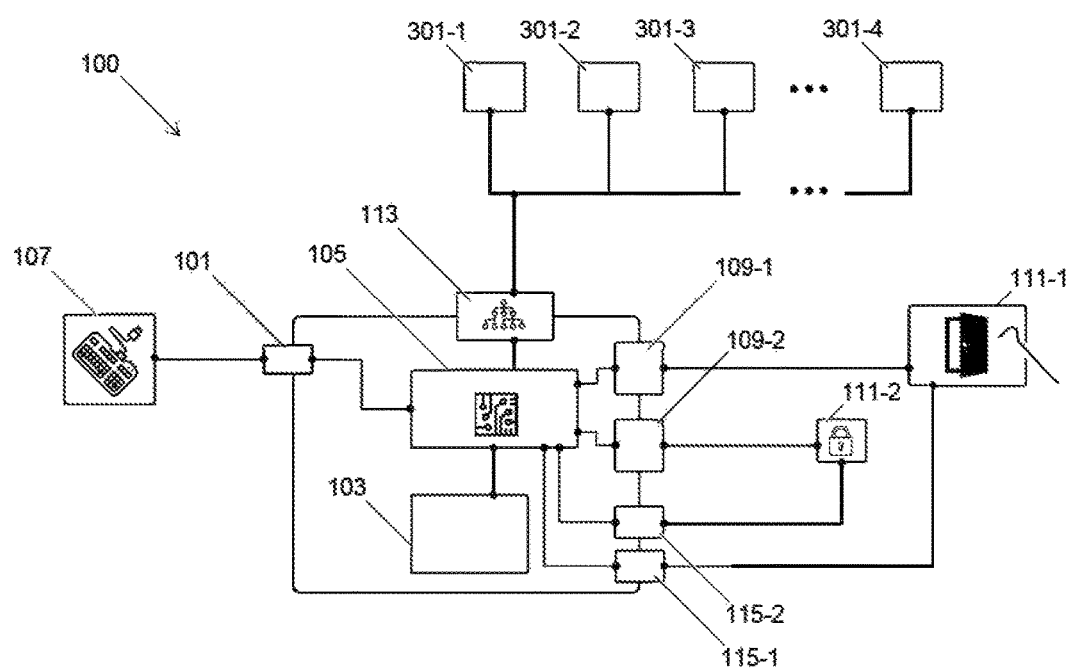
FIG. 3 shows a network-compatible device in one example.

FIG. 3 shows a schematic view of a network-compatible device 100, with a signal input 101 which is designed to receive a control signal and a configuration signal, a memory 103 which is designed to store first user data and a controller 105 which is designed to execute a safety function upon receipt of the control signal, which destroys the first user data in the memory 103.

The network-compatible device 100 further comprises a network interface 113 and the controller 105 is designed to monitor whether access to the network-compatible device 100 takes place via the network interface 113 and to perform the security function upon detection of an access if at the second switching signal input 109-2 the second switching signal is not present.

Furthermore, the network-compatible device 100 comprises a first switching signal output 115-1, which is connected to the first switch 111-1, and a second switching signal output 115-2, which is connected to the second switch 111-2. The controller 105 is signed to provide the first switching signal at the first switching signal output 115-1 and to provide the second switching signal at the second switching signal output 115-2.

The controller 105 is also designed to generate a dynamic, unambiguous signal as the first switching and as the second switching signal, and to compare the signal present at the first switching signal input 109-1 and the second switching signal input 109-2, respectively, with the dynamic, unambiguous signal. Furthermore, the controller 105 is designed to carry out the safety function in the event of a signal deviation between the provided dynamic, unambiguous signal and the respective switching signal received.

The first switch can in particular be a door contact and the second switch can in particular be a door lock contact, wherein a first connection of the door contact and further first connection of the door lock contact can each be supplied with an electrical voltage. When the door is opened, the door contact can close and the electrical voltage present at the first switching signal input. Furthermore, when the door lock is opened and or actuated, the door look contact can close, so that the electrical voltage is present at the second switching signal input. For example, in this state the same signal can be applied to the first switching signal input and the second switching signal input.

The door contact can close in particular if the door is opened independently of the door lock contact. For example, the door contact can close if the door is broken open or otherwise opened without prior actuation of the door lock contact, The network-compatible device can in particular be arranged such that physical access to the network-compatible device is not possible without opening the door. Accordingly, the network-compatible device can be protected against unauthorized access via the door contact in conjunction with the door lock contact.

Furthermore, the controller 105 is designed to send a message to at least one further network-compatible device 301-1, 301-2, 301-3, 301-4 when the security function is triggered by means of the network interface 113, in order to also trigger destruction of user data on the further network-compatible device 301-1, 301-2, 301-3, 301-4.

The message can be an individual message which is addressed to a specific further network-compatible device 301-1, 301-2, 301-3, 301-4, the individual message comprising an instruction for executing a security function for deleting user data on the further network-compatible device 301-1, 301-2, 301-3, 301-4.

Alternatively, the message can be a broadcast message which is addressed to an indefinite number of further network-compatible devices 301-1, 301-2, 301-3, 301-4. The broadcast message comprises an instruction for executing a security function for deleting user data on the respective network-compatible device 301-1, 301-2, 301-3, 301-4.

The controller 105 is also designed to replace the first user data standard data when the safety function is carried out, the further operation of the network-compatible device being prevented in the context of the specific application by loading the standard data.

The standard data can also be contained in the message transmitted via the network and/or can be stored in the memory 103 during the manufacture of the network-compatible device 100.

The controller 105 can also be designed to generate a confirmation message and to provide via the network interface that the first user data have been destroyed. In particular, information about the reason for triggering the safety function can be contained in the message.

REFERENCE LIST 100 network-compatible device
101 signal input
103 memory
105 controller
107 user interface
109-1 first signal input
109-2 second signal input
111-1 first switch
111-2 second switch
113 network interface
115-1 first switching signal output
115-2 second switching signal output
301-1 further network-compatible device
301-2 further network-compatible device
301-3 further network-compatible device
301-4 further network-compatible device

What is claimed is:

1. A network-compatible device with a security function for destroying user data, the network-compatible device comprising:
a signal input configured to receive a control signal and a configuration signal;
a memory configured to store a first user data; and
a controller configured, upon receipt of the control signal, to carry out a safety function which destroys the first user data in the memory, wherein the network-compatible device is inoperable when the first user data is destroyed, and
wherein the controller is further configured, upon receipt of the configuration signal, the configuration signal comprising a second user data, to store the second user data in the memory such that the network-compatible device is enabled to operate based on the second user data, and
wherein the controller is further configured to replace the first user data with a standard data when the safety function is carried out, wherein a further operation of the network-compatible device in a context of a specific application is prevented by the standard data.

2. The network-compatible device according to claim 1, wherein the signal input is configured to receive a maintenance signal, and wherein the controller is configured to carry out the safety function if the maintenance signal is not present at the signal input during operation of the network-compatible device.

3. The network-compatible device according to claim 2, wherein the operation of the controller is configurable based at least in part on a shape of the maintenance signal to be received by the signal input.

4. The network-compatible device according to claim 1, further comprising a user interface connected upstream of the signal input, wherein the user interface is configured to detect a user input and to provide the user input via the signal input to the controller, wherein the controller is configurable via the user interface, and wherein the user interface is configured to generate one or more of the control signal or the configuration signal.

5. The network-compatible device according to claim 1, wherein the signal input is a digital input configured to receive a coded maintenance signal, wherein the controller is configured to prevent a destruction of the first user data if the coded maintenance signal is present at the digital input during operation of the network-compatible device.

6. The network-compatible device according to claim 1, further comprising a first switching signal input and a second switching signal input, wherein the first switching signal input is configured to receive a first switching signal and the second switching signal input is configured to receive a second switching signal, and wherein the controller is configured to carry out the safety function when the first switching signal is applied to the first switching signal input if the second switching signal is not present at the second switching signal input.

7. The network-compatible device according to claim 6, wherein a first switch is connected to the first switching signal input and a second switch is connected to the second switching signal input, wherein the first switching signal input is configured to receive the first switching signal via the first switch and the second switching signal input is configured to receive the second switching signal via the second switch.

8. The network-compatible device according to claim 6, further comprising a network interface, wherein the controller is configured to monitor whether the network-compatible device is accessed via the network interface and to execute the safety function by determining access if the second switching signal is not present at the second switching signal input.

9. The network-compatible device according to claim 7, further comprising a first switching signal output connected to the first switch, and a second switching signal output connected to the second switch, wherein the controller is configured to provide the first switching signal at the first switching signal output and to provide the second switching signal at the second switching signal output.

10. The network-compatible device according to claim 9, wherein the controller is configured to generate a dynamic, unambiguous signal as the first switching signal or as the second switching signal, and wherein the controller is further configured to compare the signal present at the first switching signal input or the second switching signal input with the dynamic, unambiguous signal generated, wherein the controller is further configured, in an event of a signal deviation between the provided dynamic, unambiguous signal and the received switching signal to carry out the safety function.

11. The network-compatible device according to claim 1, further comprising a network interface, wherein the controller is configured to send a message to at least one further network-compatible device by triggering the security function via the network interface, such that destruction of user data is also triggered on the at least one further network-compatible device.

12. The network-compatible device according to claim 11, wherein the message is an individual message addressed to a specific further network-compatible device, wherein the individual message comprises an instruction for carrying out a security function for deleting user data on the at least one further network-compatible device.

13. The network-compatible device according to claim 11, wherein the message is a broadcast message addressed to one or more further network-compatible devices, wherein the broadcast message comprises an instruction for carrying out a security function for deleting user data on a respective network-compatible device of the one or more further network-compatible devices.

14. The network-compatible device according to claim 11, wherein the controller is configured to monitor the network interface and to receive a message via the network interface, wherein the controller is further configured to carry out the security function upon receipt of the message.

\* \* \* \* \*